INVENTORS.
WILLIAM G. HARMON,
JAMES L. DE WOLF,
BY J. K. Haskell
ATTORNEY.

INVENTORS.
WILLIAM G. HARMON,
JAMES L. DE WOLF,
BY J. K. Haskell
ATTORNEY.

United States Patent Office 3,445,772

Patented May 20, 1969

3,445,772

RF PHASE SHIFT POWER CODER

William George Harmon, Torrance, and James L. de Wolf, Playa Del Rey, Calif., assignors to Hughes Aircraft Company, a corporation of Delaware Filed Sept. 22, 1965, Ser. No. 489,260
Int. Cl. H04b *1/04;* H03c *3/00;* H01p *5/12*
U.S. Cl. 325—126 12 Claims

ABSTRACT OF THE DISCLOSURE

An RF power coding system, where, in one embodiment, the RF energy signal is applied to a first circulator which routes the RF energy signal to a voltage-controllable switching device capable of coding the RF energy signal. In a transmissive mode the RF energy passes through the switching device, while in a reflective mode the RF energy is reflected by the switching device. The nonreflected signal travels to the antenna via a second circulator, while the reflected signal travels a second path to the antenna via the first circulator, an attenuator, a phase shifting device and the second circulator.

This invention relates to RF power coding and more particularly to RF power coding wherein the RF energy is coded subsequent to the final power amplification of the RF energy.

In a conventional RF power system the RF signal is coded prior to final power amplification; thereby enabling distortion to be introduced into the coded RF signal by the final power amplification process. In addition, on account of time limitations imposed by the switching devices employed in such systems, the switching time required for a high power RF signal is excessive for some applications. Moreover, energy losses are sustained in the transmission line between the high power level type modulator and the antenna.

It is, therefore, an object of this invention to provide an improved system for coding RF energy.

It is a further object of this invention to provide a system for switching RF energy more rapidly than has been afforded with comparable devices of the prior art.

It is a still further object of this invention to provide a RF energy coding system in which the coding device is physically located as close to the antenna as is practical in order to minimize energy loss in the RF power system.

Briefly, in accordance with the objects set forth above, the RF power coding system according to the present invention includes a switching device capable of coding a RF energy signal. A RF power source applies the RF energy signal to a circulator which routes the RF energy to the switching device. The RF energy either passes through the switching device or is reflected by such device. The nonreflected signal travels to the antenna via a second circulator, while the reflected signal travels a second path to the antenna via both such above-mentioned circulators and an attenuator and a phase shifting device.

Additional objects, advantages and characteristic features of the present invention will become readily apparent from the following detailed description of preferred embodiments of the invention when considered in conjunction with the accompanying drawings in which.

The RF power coding systems according to the present invention have two basic applications. First, they may be used to radiate a coded RF signal having an "on-off" type of transmission, i.e., wherein the radiated signal comprises alternating periods of maximum and negligible, or minimum, RF energy. Alternately, the systems may be employed to radiate a phase-coded RF signal, the amplitude of which is held constant upon transmission so that undesirable side lobe effects are not present at the receiver upon detection of the radiated RF signal. Both applications utilize the signal developing portion (i.e., the modulating, amplifying and code generating portions of the system) in the same fashion; it is the attenuator and the phase shifting portions of the systems which determine whether the system operates to effectuate an "on-off" type of transmission or if they operate to generate phase-coded RF transmission having amplitude leveling.

Figure 1:
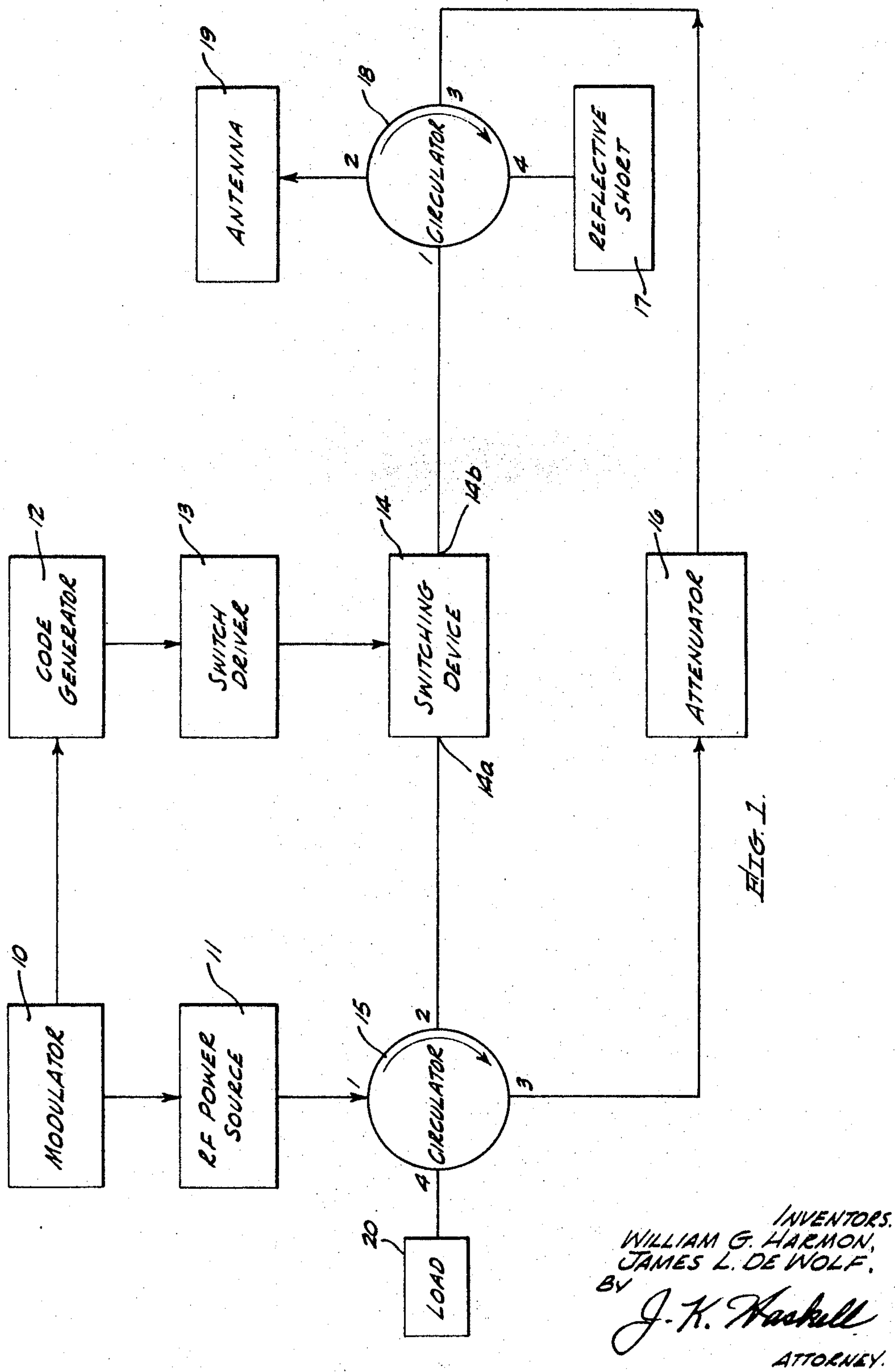
FIGURE 1 is a schematic diagram illustrating a RF power coding system in accordance with one embodiment of this invention.

As shown in FIG. 1, a modulator 10, such as a conventional line type modulator, applies an intelligence bearing output signal to a RF source 11 which may be a magnetron, traveling wave tube, klystron or their equivalents. A synchronizing signal from the modulator 10 is fed to a code generator 12 which may be a binary code generating device. The coded output signal from the generator 12 is applied to a switch driver 13, the output of which in turn controls the state of a switching device 14 which effectuates desired coding of the RF energy.

The switching device 14 is located in a first path of the output RF energy from source 11. The switching device 14 may be a multipactor, gas discharge tube or equivalent devices when the peak power level of the RF energy to be coded is in excess of 100 kilowatts; however, at lower power levels semiconductor diodes may be utilized instead.

As is well known, a multipactor is a high vacuum cell device which provides rapid switching of microwave energy at high power levels. Such a device is described in an article by M. P. Forrer and C. Milazzo entitled, "Duplexing and Switching With Multipactor Discharges," in the Proceedings of the IRE, April 1962, pp. 442–450. The multipactor utilized in this invention is the narrow band, or resonant cavity type. The gap spacing within the multipactor cell is designed so that the high power RF input energy will accelerate electrons across the gap in one-half RF periods. The electrode material of the multipactor cell has a secondary emission ratio greater than unity so that the electron density rapidly increases with each half-cycle. In the absence of a control voltage, high power RF input energy is able to establish a multipactor discharge within the cell.

This multipactor discharge provides a short-circuit action within the multipactor cell whereby a sheet of electrons is driven back and forth between two electrodes by, and in synchronism with, the RF input energy applied. In other words, a RF current path is placed across the transmission line, thus the multipactor is in a reflective mode and the input RF energy is reflected. On the other hand, when the control voltage is present, the multipactor discharge is quenched; therefore, the multipactor is in a transmissive mode, and the input energy travels through the cell. Since switching times for a multipactor are of the order of a few nanoseconds, extremely fast coding of high power RF energy can be accomplished through the use of a multipactor in the aforementioned manner.

A first circulator 15 and a second circulator 18 are utilized to route the RF energy in separate paths of the system. A load 20 is connected to a port 4 of the circulator 15. This load 20, which may be any of a number of energy dissipating devices, is used to absorb any energy mismatches or other spurious effects in the RF energy source portion of the system. As shown in FIG. 1, an attenuator 16, which may be of conventional material and impedance design capable of handling high power RF energy in excess of 100 kilowatts, is located in a second path of RF energy which is parallel to the first path of RF energy. A reflective short circuiting device 17 is also located in the second path of RF energy. Such reflective short 17 is a one port variable short circuit device. The antenna 19, which may be any of a number of typical radiating devices depending upon the requirements of the system employed, is connected to a port 2 of a circulator 18.

In the operation of the system in FIG. 1, energy from the RF power source 11 travels to a port 1 of the circulator 15. The transmission line between the RF power source 11 and the circulator 15 may be only the length of the connecting port arm of the circulator or a separate length of waveguide. The RF energy passes through the circulator 15 via the ports 1 and 2 to a port 14*a* of the switching device 14. If the switching device 14 is in the transmissive mode the RF energy passes through the switching device to the antenna 19 via the ports 1 and 2 of the circulator 18.

However, when the switching device 14 is in the reflective mode, the RF energy arriving at a port 14*a* of the switching device 14 will be reflected back to the circulator 15. This reflected RF energy will then travel to the attenuator 16 via the ports 2 and 3 of the circulator 15.

If the aforementioned "on-off" type of transmission is desired, the attenuator 16 is adjusted so that most of the reflected RF energy is dissipated in the attenuator 16, with load 20 coupled to the port 4 of the circulator 15 absorbing energy not directed into the attenuator due to energy mismatches and other spurious effects. The attenuator 16 is adjusted to dissipate the proper percentage of RF energy so that enough RF energy is passed through the attenuator 16 to match any leakage energy passing through the switching device 14 during the reflective mode. Then the variable reflective short circuiting device 17 is adjusted to reflect such energy not dissipated by the attenuator 16 at a phase 180° from that of any energy leakage through the switching device 14. Thus, none of the RF energy will travel to the antenna when the switching device 14 is in the reflective mode; therefore, the radiated RF energy will be coded in alternating periods of maximum and negligible, or minimum, RF energy.

If phase-coded RF transmission having a considerable amplitude is desired, most of the reflected RF energy is not dissipated in the attenuator 16. Instead, the attenuator 16 is adjusted so that the amplitude of the reflected RF energy is equal to the amplitude of the nonreflected RF energy traveling through the switching device 14. The reflected RF energy then travels to the variable reflective short circuiting device 17 via the ports 3 and 4 of the circulator 18, and is reflected from the short circuiting device 17 to a port 14*b* of the switching device 14 via the ports 4 and 1 of the circulator 18. Since the switching device 14 is in the reflective mode, this RF energy is reflected from the port 14*b* of the switching device 14 to the antenna 19 via ports 1 and 2 of the circulator 18. By varying the location of the short circuit provided by device 17, the path length that the RF energy must travel when the switching device 14 is in the reflective mode may be readily made different from the path length that the RF energy must travel when the switching device 14 is in the transmissive mode, thereby facilitating phase modulation of the RF energy from the source 11.

For the purpose of phase-coded transmission, any leakage of the RF energy through the switching device 14 during the reflective mode is considered negligible. Therefore, the variable reflective short circuiting device 17 acts as a phase shifter to phase modulate the signal to be radiated from the antenna 19 rather than as a reflective short circuiting device to facilitate cancellation of RF energy leakage through the switching device 14.

With the attenuator 16 adjusted properly, the amplitudes of the signals applied to the antenna 19 may be made equal, thereby providing a constant amplitude phase-coded radiated signal. As a result, undesirable side lobe effects which might otherwise be detected upon reception of the phase-coded RF signal are eliminated. Therefore, as shown in FIG. 1, the control, coding or rerouting of the RF energy from the source 11 of the antenna 19 may be accomplished by the switching device 14. Thus, modulation of RF energy may be performed after the final power amplification of the RF energy.

Figure 2:
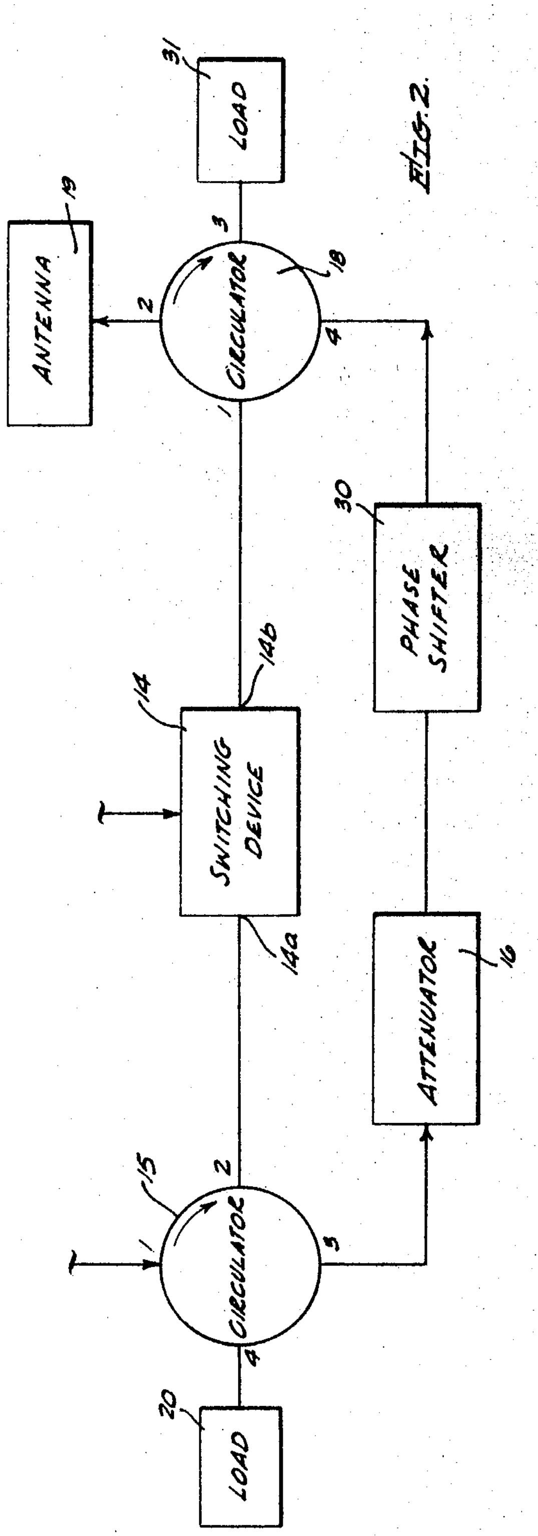
FIG. 2 is a schematic diagram illustrating a RF power coding system in accordance with a second embodiment of this invention.

Referring now to FIG. 2, there is shown a modification of the RF power coding system shown in FIG. 1. In the system of FIG. 2, a phase shifter 30 is coupled into the reflected energy path between the attenuator 16 and the circulator 18. The phase shifter 30, which may be a conventional two-port device commonly known as a line stretcher, functions to delay or advance the phase of the energy applied from the attenuator by a predetermined amount relative to the phase of the nonreflected energy. By placing the phase shifter 30 subsequent to the attenuator 16 and prior to the circulator 18, the reflected RF energy input lead to circulator 18 may be coupled to the port 4 rather than to the port 3 as was the case with the system of FIG. 1. Thus, the reflected RF energy of the system of FIG. 2 has one less quarter circulator path length to travel through the circulator 18 than in the system of FIG. 1. As a result, the system of FIG. 2 affords less loss in travel through the circulator 18 than the system of FIG. 1.

An additional advantage of the system of FIG. 2 over that of FIG. 1 is that a suitable load 31, which may be any one of a number of conventional energy dissipating devices, may be connected to the otherwise unused port 3 of the circulator 18. The load 31 is utilized to absorb any energy directed out of the port 3 due to any energy mismatch, e.g., mismatch caused by the rotation of the antenna, so that such energy is not reflected back into the system.

In the operation of the system in FIG. 2, the reflected portion of the RF energy travels from the first circulator 15 through the attenuator 16 and the phase shifter 30 to the port 4 of the circulator 18. As in the system of FIG. 1, the attenuator 16 of FIG. 2 may be adjusted so that the amplitude of the reflected RF energy is equal to the amplitude of the nonreflected RF energy in order to eliminate the undesired side lobe effects upon detection of the resultant radiated signal.

Then the reflected RF energy is routed through the ports 4 and 1 of circulator 18 to the port 14*b* of the switching device 14. Since the switching device 14 is in the reflective mode, the RF energy arriving at the switching device will be reflected back into the port 1 of the circulator 18. The RF energy will then travel to the antenna 19 via the port 2 of the circulator 18. The phase of the reflected RF energy may be adjusted relative to the phase of the nonreflected RF energy by varying the phase shifter 30; therefore, the RF energy radiated from the antenna 19 may be phase-coded.

If "on-off" transmission is desired, the attenuator 16 is adjusted so that most of the reflected RF energy is dissipated by the attenuator 16. However, sufficient RF energy is allowed to pass through the attenuator 16 to cancel any RF energy leakage through the switching device 14. This cancellation may be accomplished by adjusting the phase shifter 30 so that the reflected RF energy not dissipated by the attenuator 16 is 180° out of phase with any RF energy leakage passing through switching device 14 during its reflective mode of operation. Thus, the radiating RF energy will be coded in alternating periods of maximum and negligible, or minimum, RF energy.

Figure 3:
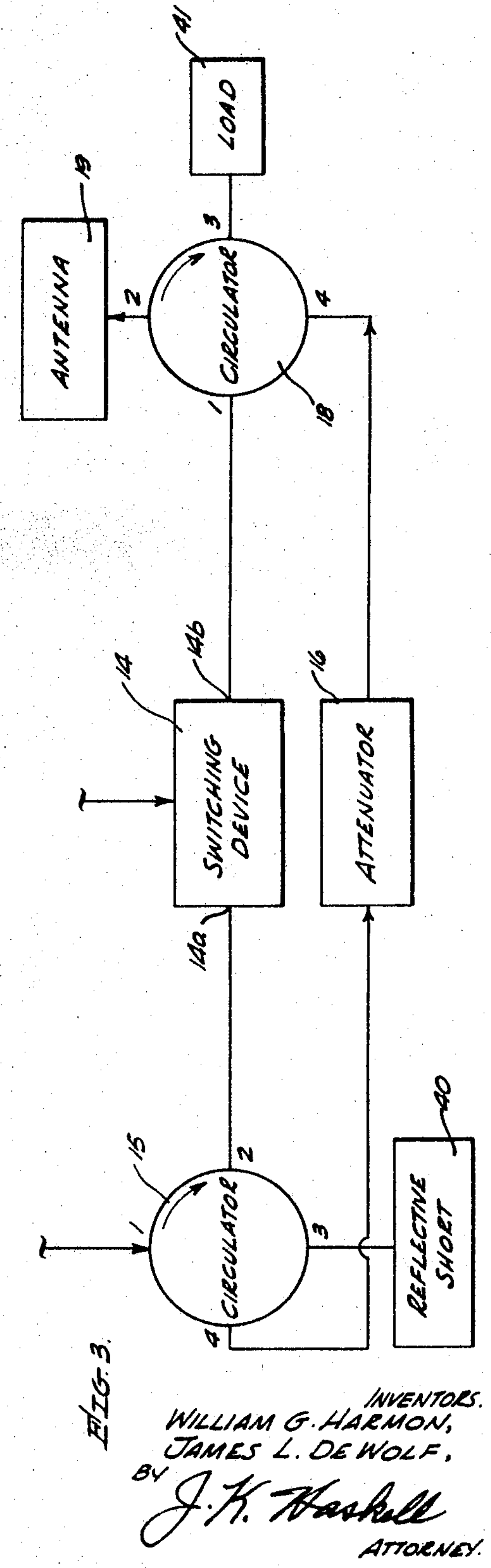
FIG. 3 is a schematic diagram showing a RF power coding system in accordance with a third embodiment of this invention.

Referring now to FIG. 3, another modification of the RF power coding system of FIG. 1 is shown. In this configuration a reflective short circuiting device 40 is connected to the port 3 of the first circulator 15 and an auxiliary load 41 is connected to the port 3 of the second circulator 18. The reflective short circuiting device 40, which may be a conventional one port device, is utilized to delay or advance the phase of the reflected RF energy by a predetermined amount relative to the phase of the nonreflected RF energy. The load 41 is utilized to absorb any energy directed out of the port 3 due to any energy mismatch, e.g., mismatch caused by the rotation of the antenna so that such energy is not reflected back into the system.

In the operation of the system of FIG. 3, during the time when the switching device 14 is in the transmissive mode, the RF energy from the source 11 is routed to the antenna 19 via the ports 1 and 2 of the circulator 15, the switching device 14, and the ports 1 and 2 of the circulator 18.

When the switching device 14 is in the reflective mode, the RF energy is reflected from the port **14*a* of the switching device 14 through the ports 2 and 3 of the circulator 15 to the reflective short circuiting device 40 and then through the ports 3 and 4 of the circulator 15. The phase of the reflected portion of the RF energy is controlled by the reflective short circuiting device 40 which is coupled to the port 3 of the circulator 15. Thus, the reflected portion of the RF energy travels similarly to the reflected RF energy in the system of FIG. 1, except that the shift in phase is effected prior to the passage of the reflected RF energy through the attenuator 16. This reflected RF energy then travels through the attenuator 16 and to the port 14*b* of the switching device 14 via the ports 4 and 1 of the circulator 18. Since the switching device 14 is in the reflective mode, the RF energy is reflected back through the ports 1 and 2 of the circulator 18 to the antenna 19. The load 41** is utilized to compensate for any energy mismatch in the radiating portion of the system as described above.

It will be apparent that the system of FIG. 3 is essentially the same as that of FIG. 1, except that the reflective short circuiting device 40 of FIG. 3 is coupled to the circulator 15 rather than to the circulator 18, and the auxiliary load 41 of FIG. 3 is coupled to the circulator 18 rather than to the circulator 15. The choice as to the system to be used in a given application depends primarily on which energy mismatch, i.e., that in the source portion or that in the antenna portion, is desired to be eliminated.

While particular embodiments of the invention have been shown and described, it should be apparent that various modifications may be made therein which are obvious to a person skilled in the art. Therefore, the foregoing disclosure is intended as merely illustrative of the invention and should not be construed in a limiting sense.

What is claimed is:

1. A RF energy coding system comprising:
first means for receiving RF energy;
second means for utilizing coded RF energy;
a RF energy switching device having a first port and a second port and selectively providing a first operating condition in which a transmission path is established for RF energy through said device between said first and second ports, and a second operating condition in which RF energy entering each of said first and second ports is reflected back out the same port;
first RF energy circulating means for coupling said first means to said first port;
second RF energy circulating means for coupling said second port to said second means, whereby a first propagation path is provided between said first and second RF energy circulating means;
means for providing a second propagation path for RF energy between said first and second RF energy circulating means in parallel with said first propagation path; and
means for controlling said switching device to selectively establish said first and second operating conditions therein, and thereby cause coded RF energy to be applied to said second means.

2. A RF energy coding system comprising:
first means for receving RF energy;
second means for utilizing coded RF energy;
a RF energy switching device having a first port and a second port and selectively providing a first operating condition in which a transmission path is established for RF energy through said device between said first and second ports, and a second operating condition in which RF energy entering each of said first and second ports is reflected back out the same port;
first RF energy circulating means for coupling said first means to said first port;
second RF energy circulating means for coupling said second port to said second means, whereby a first propagation path is provided between said first and second RF energy circulating means;
first and second energy dissipating means connected to said first and second energy circulating means, respectively, to dissipate undesirable energy being reflected toward said first means and from said second means, respectively;
means for providing a second propagation path for RF energy between said first and second RF energy circulating means in parallel with said first propagation path;
attenuator means in said second propagation path to attenuate the amplitude of the RF energy traversing said attenuator means such that said amplitude is essentially equal to the amplitude of the RF energy traversing said first propagation path upon arrival at said second means;
phase shifter means in said second propagation path to adjust the phase of the RF energy traversing said second propagation path relative to the phase of the RF energy traversing said first propagation path; and
means for controlling said switching device to selectively establish said first and second operating conditions therein.

3. A RF energy coding system comprising:
a source of RF energy;
antenna means for radiating RF energy;
a RF energy switching device having a first port and a second port and selectively providing a first operating condition in which a transmission path is established for RF energy through said device between said first and second ports, and a second operating condition in which RF energy entering said first port is reflected back out said first port, except for a small amount of leakage RF energy which is transmitted through said RF switching device from said first port to said second port;
first RF energy circulating means for coupling said source with said first port;
second RF energy circulating means for coupling said second port with said antenna means, whereby a first propagation path is provided between said first and second RF energy circulating means;
first and second energy dissipating means connected to said first and second energy circulating means, respectively, to dissipate undesirable energy being reflected toward said source and being reflected from said antenna means, respectively;
means for providing a second propagation path for RF energy between said first and second RF energy circulating means in parallel with said first propagation path;
attenuator means in said second propagation path for attenuating a substantial portion of the RF energy traversing said second propagation path;
phase shifter means in said second propagation path to adjust the phase of the RF energy traversing said second propagation path relative to the phase of the leakage RF energy traversing said first propagation path; and means for controling said switching device to selectively establish said first and second operating conditions therein.

4. A RF energy coding system comprising:

input means for receiving RF energy;

output means for utilizing coded RF energy;

a RF energy switching device having a first port and a second port and selectively providing a first operating condition in which a transmission path is established for RF energy through said device between said first and second ports, and a second operating condition in which RF energy entering each of said first and second ports is reflected back out the same port;

first RF energy circulating means for coupling said input means to said first port;

second RF energy circulating means for coupling said second port to said output means, whereby a first signal flow path is provided between said first and second RF energy circulating means;

energy dissipating means coupled to said first energy circulating means to dissipate undesirable energy being reflected toward said input means;

means for providing a second signal flow path for RF energy between said first and second RF energy circulating means in parallel with said first signal flow path;

attenuator means in said second signal flow path to attenuate the amplitude of the RF energy traversing said attenuator means such that said amplitude is essentially equal to the amplitude of the RF energy traversing said first signal flow path upon arrival at said output means;

reflective short circuiting means coupled to said second RF energy circulating means to adjust the phase of the RF energy traversing said second signal flow path relative to the phase of the RF energy traversing said first signal flow path; and means for controlling said switching device to selectively establish said first and second operating conditions therein.

5. A RF energy coding system comprising:

a source of RF energy;

antenna means for radiating RF energy;

a RF energy switching device having a first port and a second port and selectively providing a first operating condition in which a transmission path is established for RF energy through said device between said first and second ports, and a second operating condition in which RF energy entering each of said first and second ports is reflected back out the same port;

first RF energy circulating means for coupling said source with said first port;

second RF energy circulating means for coupling said second port with said antenna means, whereby a first signal flow path is provided between said first and second RF energy circulating means;

energy dissipating means coupled to said second energy circulating means to dissipate undesirable energy being reflected from said antenna means;

means for providing a second signal flow path for RF energy between said first and second RF energy circulating means in parallel with said first signal flow path;

attenuator means in said second signal flow path to attenuate the amplitude of the RF energy traversing said attenuator means such that said amplitude is essentially equal to the amplitude of the RF energy traversing said first signal flow path arrival at said antenna;

reflective short circuiting means coupled to said first RF energy circulating means to adjust the phase of the RF energy traversing said second signal flow path relative to the phase of the RF energy traversing said first signal flow path; and means for controlling said switching device to selectively establish said first and second operating conditions therein.

6. A RF energy coding system comprising:

a source of RF energy;

antenna means for radiating RF energy;

a RF energy switching device having a first port and a second port and selectively providing a first operating condition in which a transmission path is established for RF energy through said device between said first and second ports, and a second operating condition in which RF energy entering said first port is reflected back out said first port, except for a small amount of leakage RF energy which is transmitted through said RF switching device from said first port to said second port;

first RF energy circulating means for coupling said source with said first port;

second RF energy circulating means for coupling said second port with said antenna means, whereby a first signal flow path is provided between said first and second RF energy circulating means;

energy dissipating means coupled to said first energy circulating means to dissipate undesirable energy being reflected toward said source;

means for providing a second signal flow path for RF energy between said first and second RF energy circulating means in parallel with said first signal flow path;

attenuator means in said second signal flow path for attenuating a substantial portion of the RF energy traversing said second signal flow path;

reflective short circuiting means coupled to said second RF energy circulating means to adjust the phase of the RF energy traversing said second signal flow path relative to the phase of the RF energy traversing said first signal flow path; and means for controlling said switching device to selectively establish said first and second operating conditions therein.

7. A RF energy coding system comprising:

a source of RF energy;

antenna means for radiating RF energy;

a RF energy switching device having a first port and a second port and selectively providing a first operating condition in which a transmission path is established for RF energy through said device between said first and second ports, and a second operating condition in which RF energy entering said first port is reflected back out said first port, except for a small amount of leakage RF energy which is transmitted through said RF switching device from said first port to said second port;

first RF energy circulating means for coupling said source with said first port;

second RF energy circulating means for coupling said second port with said antenna means, whereby a first signal flow path is provided between said first and second RF energy circulating means;

energy dissipating means coupled to said second energy circulating means to dissipate undesirable energy being reflected from said antenna means;

means for providing a second signal flow path for RF energy between said first and second RF energy circulating means in parallel with said first signal flow path;

attenuator means in said second signal flow path for attenuating a substantial portion of the RF energy traversing said second signal flow path;

reflective short circuiting means coupled to said first RF energy circulating means to adjust the phase of the RF energy traversing said second signal flow path relative to the phase of the RF energy traversing said first signal flow path; and means for controlling said switching device to selectively establish said first and second operating conditions therein.

8. A RF energy coding system comprising:

a source of RF energy;

antenna means for radiating RF energy;

a multipactor having a first port and a second port and selectively providing a first operating condition in which a transmission path is established for RF energy through said device between said first and second ports, and a second operating condition in which RF energy entering each of said first and second ports is reflected back out the same port;

first RF energy circulating means for coupling said source with said first port;

second RF energy circulating means for coupling said second port with said antenna means, whereby a first propagation path is provided between said first and second RF energy circulating means;

first and second energy dissipating means connected to said first and second energy circulating means, respectively, to dissipate undesirable energy being reflected toward said source and being reflected from said antenna means, respectively;

means for providing a second propagation path for RF energy between said first and second RF energy circulating means in parallel with said first propagation path;

attenuator means in said second propagation path to attenuate the amplitude of the RF energy traversing said attenuator means such that said amplitude is essentially equal to the amplitude of the RF energy traversing said first propagation path upon arrival at said antenna;

phase shifter means in said second propagation path to adjust the phase of the RF energy traversing said second propagation path relative to the phase of the RF energy traversing said first propagation path; and means for controlling said switching device to selectively establish said first and second operating conditions therein.

9. A RF energy coding system comprising:

a source of RF energy;

antenna means for radiating RF energy;

a multipactor device having a first port and a second port and selectively providing a first operating condition in which multipactor discharge is prevented, whereby a transmission path is established for RF energy through said multipactor device between said first and second ports, and a second operating condition in which RF energy entering said first port establishes a multipactor discharge within said multipactor device whereby electrons are driven back and forth within said multipactor device to effectively provide a reflective short circuiting condition to reflect said RF energy from said first port, except for a small amount of leakage RF energy which is transmitted through said multipactor device from said first port to said second port;

first RF energy circulating means for coupling said source with said first port;

second RF energy circulating means for coupling said second port with said antenna means, whereby a first signal flow path is provided between said first and second RF energy circulating means;

energy dissipating means coupled to said second energy circulating means to dissipate undesirable energy in the antenna portion of the system;

means for providing a second signal flow path for RF energy between said first and second RF energy circulating means in parallel with said first signal flow path;

attenuator means in said second signal flow path for attenuating a substantial portion of the RF energy traversing said second signal flow path;

reflective short circuiting means coupled to said first RF energy circulating means to adjust the phase of the RF energy traversing said second signal flow path relative to the phase of the RF energy traversing said first signal flow path; and means for controlling said switching device to selectively establish said first and second operating conditions therein.

10. A RF energy coding system comprising:

a source of RF energy;

an antenna;

a first signal flow path including a multipactor device having a first port and a second port, said multipactor device selectively providing a first and second operating condition, said first operating condition establishes a transmission path for RF energy through said multipactor device between said first and second ports, and said second operating condition in which RF energy entering each of said first and second ports is reflected back out the same port;

a second signal flow path including an attenuator and a phase shifter device coupled in series;

a first circulator having first, second, third and fourth ports successively arranged along its circumferential surface such that RF energy travels from the port which it entered to the next successive port, said first port being coupled to said source, said second port being coupled to said first port of said multipactor, said third port being coupled to said attenuator, and a first energy dissipating load being coupled to a fourth port;

a second circulator having first, second, third and fourth ports successively arranged along its circumferential surface such that RF energy travels from the port which it entered to the next successive port, said first port being coupled to said second port of said multipactor, said second port being coupled to said antenna, a second energy dissipating load being coupled to said third port, and said fourth port being coupled to said phase shifter device; and means for controlling said multipactor device to selectively establish said first and second operating conditions therein.

11. A RF energy coding system comprising:

a source of RF energy;

an antenna;

a multipactor device having a first port and a second port and selectively providing a first operating condition in which a transmission path is established for RF energy through said device between said first and second ports, and a second operating condition in which RF energy entering each of said first and second ports is reflected back out the same port;

a first circulator having first, second, third and fourth ports successively arranged along its circumferential surface such that RF energy is transferred from the respective port which it entered to the next successive port, said first port being coupled to said source, said second port being coupled to said first port of said multipactor, said attenuator being coupled to said third port, and an energy dissipating load being coupled to said fourth port;

a second circulator having first, second, third and fourth ports successively arranged along its circumferential surface such that RF energy is transferred from the respective port which it entered to the next successive port, said first port being coupled to said second port of said multipactor, whereby a first signal flow path is provided between said first and second circulators via said multipactor device, said second port being coupled to said antenna, said third port being coupled to said attenuator, whereby a second signal flow path is provided between said first and second circulators via said attenuator, and a reflective short circuiting device being coupled to said fourth port; and means for controlling said multipactor device to selectively establish said first and second operating conditions therein.

12. A RF energy coding system comprising:

a source of RF energy;

an antenna;

a first propagation path including a multipactor device having a first port and a second port, said multipactor device selectively providing a first and second operating condition, said first operating condition establishes a transmission path for RF energy through said multipactor device between said first and second ports, and said second operating condition in which RF energy entering each of said first and second ports is reflected back out the same port;

a first circulator having first, second, third and fourth ports successively arranged along its circumferential surface such that RF energy travels from the port which it entered to the next successive port, said first port being coupled to said source, said second port being coupled to said first port of said multipactor, a reflective short circuiting device being coupled to said third port, and an attenuator being coupled to said fourth port;

a second circulator having first, second, third and fourth ports successively arranged along its circumferential surface such that RF energy travels from the port which it entered to the next successive port, said first port being coupled to said second port of said multipactor device, said second port being coupled to said antenna, an energy dissipating load being coupled to said third port, and said fourth port being coupled to said attenuator, whereby a second propagation path is provided between said first and second circulators via said attenuator; and means for controlling said multipactor device to selectively establish said first and second operating conditions therein.

References Cited

UNITED STATES PATENTS

| | | | |
|---|---|---|---|
| 2,912,581 | 11/1959 | De Lang | 332—24 X |
| 3,131,367 | 4/1964 | Pitts et al. | 333—31 |
| 3,346,822 | 10/1967 | Levy et al. | 333—7 |

ROBERT L. GRIFFIN, *Primary Examiner.*

B. V. SAFOUREK, *Assistant Examiner.*

U.S. Cl. X.R.

325—163; 332—23; 333—7